Patented Apr. 13, 1943

2,316,190

UNITED STATES PATENT OFFICE 2,316,190

ACYL DERIVATIVES OF GERMINAL GLAND HORMONE PREPARATIONS OF HIGH ACTIVITY AND A METHOD OF PRODUCING THE SAME

Walter Schoeller, Berlin-Westend, and Friedrich Hildebrandt, Hohen Neuendorf, near Berlin, Germany, and Erwin Schwenk, Bloomfield, N. J., assignors to Schering Corporation, Bloomfield, N. J., a corporation of New Jersey No Drawing. Application February 21, 1935, Serial No. 7,604. In Germany February 22, 1934

18 Claims. (Cl. 260—397.5)

This invention relates to acyl derivatives of germinal gland hormone preparations of high physiological activity and more particularly to acyl derivatives of compounds of an activity similar to that of the male sex hormones, and a method of producing the same.

Hormone alcohols such as are obtained, for example, by the reaction of keto-containing saturated germinal gland hormones with organometallic halides, followed by hydrolysis, as described in application Serial No. 748,664 of Friedrich Hildebrandt, are distinguished by their physiological activity being similar to that of the male germinal gland hormones. Said compounds, however, are so quickly eliminated from the organism that frequent applications are necessary in order to attain a lasting effect.

Now it has been discovered that this disadvantage can be remedied by using, instead of the alcohols or keto alcohols, their esters which only gradually are eliminated from the organism, their efficiency thus being extended over a longer period. They form, so to say, a hormone deposit in the organism.

Known methods may be employed for the production of these esters. Thus, for instance, the alcohols may be reacted with acid chlorides in the presence of inorganic or organic bases. Of course, other acylation methods may also be used. When dihydroxy compounds are employed, mono- or diacylderivatives are formed, depending on the method used.

For instance, by carrying out the reaction in a solvent wherein the primarily formed monoacyl derivative is soluble only with difficulty, the acylation can be interrupted after the formation of the monoacyl derivative.

On carrying out the acylation in a solvent wherein the mono- as well as the diacylation products are kept in solution, both hydroxy groups can be acylated.

The terms "acylation process" and "acylating agent" as used hereinafter in the specification and the claims include the known processes and agents for introducing an acyl group into a compound. The acylation may be carried out by using the acid anhydride or the acid chloride or the acid itself as acylating agents in the presence or absence of catalysts or in any other known manner.

A further method for arriving at these esters consists in the hydrogenation of the esters of the corresponding phenolic compounds, such as the alkyl derivatives of the follicle hormones produced, for example, by reacting an ether solution of follicle hormone with alkyl magnesium iodide, followed by hydrolysis and extraction with ether, as described in application Serial No. 748,664 above referred to, or the esters of the follicle hormone hydrate and similar products. The hydrogenation is interrupted when the aromatic nucleus is completely saturated. This method has the advantage that it is possible with its help to arrive at monoacyl compounds of said saturated polyalcohols. Thus, there is produced, for instance, by catalytic hydrogenation of the "methyl-diol" of the formula $C_{19}H_{26}O_2$, acylated on the phenolic hydroxy group the "3-acoxy hexahydro methyldiol."

The production of this type of partially esterified poly-alcohols is therapeutically of interest and, besides, these compounds are important as intermediate products for the production of compounds of the character of germinal gland hormones. In order to carry out the hydrogenation catalytically activated hydrogen is used in the known manner.

Instead of using catalytically activated hydrogen as hydrogenating agent, other reducing agents capable of hydrogenating carbon-to-carbon double bonds may be used. The monoacyl compounds obtained thereby may be converted into the corresponding diacyl compounds by further acylation.

The following examples serve to illustrate the invention, without, however, limiting the same to them.

EXAMPLE 1

500 mgs. of "hexahydro methyldiol" of the formula $C_{19}H_{32}O_2$, having a physiological activity of 4 mgs. for the capon unit, are dissolved in 30 cc. of dry benzene, whereupon the solution is mixed with 2 cc. of acetyl chloride. After the addition of 5 cc. of dry pyridine the reaction solution is heated to boiling for 1½ hours on the water bath. After cooling it is poured into diluted hydrochloric acid, extracted with ether, the etheral solution is washed neutral with water, dried and evaporated.

The following structural formulas serve to illustrate the compounds used as starting materials and obtained by the invention:

I. METHOD

*Starting material I*   *Reaction product II*

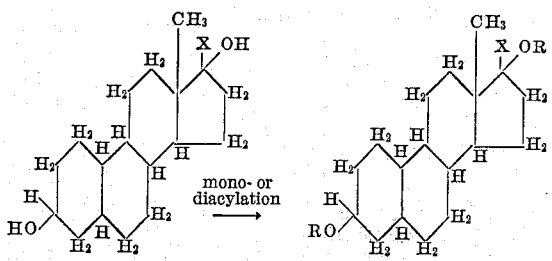

wherein X is an alkyl or aryl group.

wherein R is an acyl group in at least one position and hydrogen in the other.

*Starting material III*   *Reaction product IV*

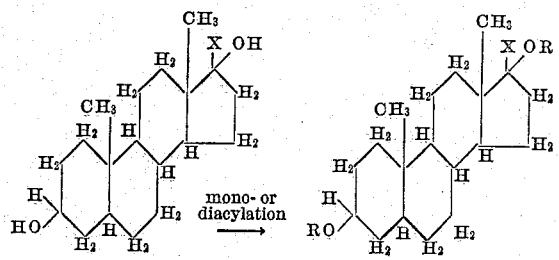

wherein X is an alkyl or aryl group.

wherein R is an acyl group in at least one position and hydrogen in the other.

II. METHOD

*Starting material V*   *Reaction product VI*

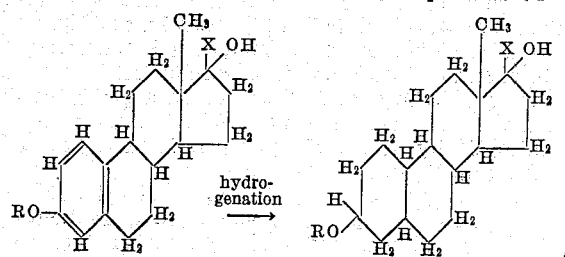

wherein X is an alkyl or aryl group and R an acyl group.

*Starting material VII*   *Reaction product VIII*

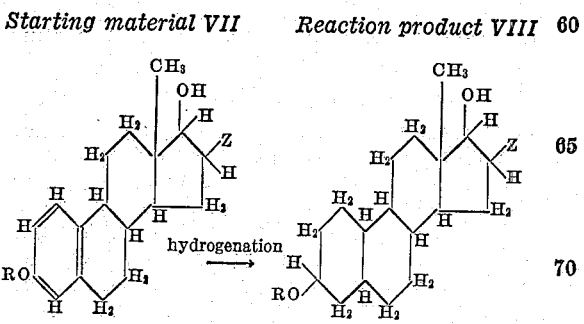

wherein Z is OH or OR and wherein R is an acyl group.

EXAMPLE 2

1 g. of the "3-acetoxy methyldiol" produced by acylation, according to Schotten-Baumann, of the Grignard compound obtained by reacting methyl magnesium iodide with crystallized follicle hormone in ether solution, followed by hydrolysis with HCl, dilution with water and extraction with ether, as described in the above-mentioned application Serial No. 748,664, is hydrogenated in glacial acetic acid solution with hydrogen in the presence of platinum oxide catalyst according to Adams-Shriner at room temperature while shaking, until the benzene nucleus is completely saturated. The reaction solution, freed from the catalyst is evaporated in a vacuum to dryness, whereby the "3-acetoxy hexahydro methyldiol" is obtained.

EXAMPLE 3

1 g. of follicle hormone hydrate acetylated on the phenolic hydroxy group, is dissolved in 200 cc. of ethyl alcohol and then treated with hydrogen in the presence of 1 g. of a previously reduced nickel catalyst, at 180° C. and 100 atmospheres in a stirring autoclave. After complete hydrogenation the reaction solution, freed from the catalyst, is evaporated to dryness. As residue there remains a viscous resin.

EXAMPLE 4

0.5 gram of methyl androsterone obtained for example according to Example 4 of application Serial No. 748,664 by reacting an ether solution of anodrosterone ($C_{19}H_{30}O_2$) with methyl magnesium iodide, the product being then hydrolyzed and extracted with ether, are dissolved in 20 grams of pure pyridine. Five times the calculated amount of benzoyl chloride is added to the solution. After allowing it to stand at room temperature for some time the reaction mixture is poured into dilute hydrochloric acid, the precipitate is filtered off and recrystallized.

Of course, many variations and changes in the selection of the starting material, the reaction conditions and the like may be made by those skilled in the art in accordance with the principles set forth herein and in the claims annexed hereto.

What we claim is:

1. A method of producing derivatives of germinal gland hormone preparations having improved physiological activity, comprising subjecting cyclopentano tetradecahydro phenanthrene derivatives of the structural formula

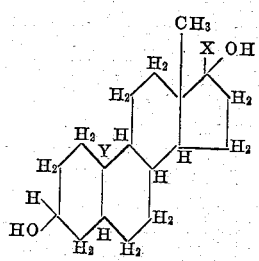

wherein X is a member of the group consisting of alkyl and aryl groups and Y is a member of the group consisting of hydrogen and the methyl group, to the action of acylating agents.

2. A method according to claim 1, wherein as starting material there is used a cyclopentano tetradecahydro phenanthrene derivative of the structural formula

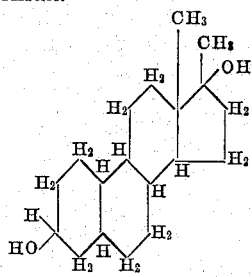

3. A method according to claim 1, wherein as starting material there is used a cyclopentano tetradecahydro phenanthrene derivative of the structural formula

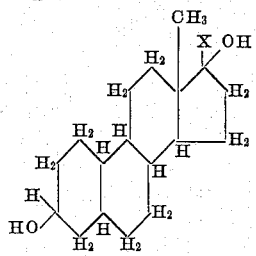

wherein X is as defined in claim 1.

4. A method according to claim 1, wherein as starting material there is used a cyclopentano tetradecahydro phenanthrene derivative of the structural formula

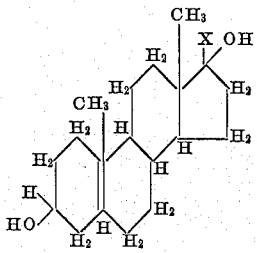

wherein X is as defined in claim 1.

5. A method according to claim 1, wherein as starting material there is used a cyclopentano tetradecahydro phenanthrene derivative of the structural formula

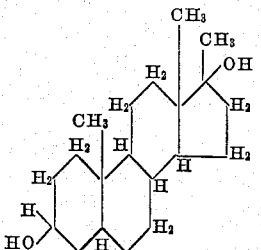

6. A method according to claim 1, wherein for the purpose of forming the monoacyl derivative, the reaction is carried out in a solvent in which the said derivative is insoluble.

7. A method according to claim 1, wherein for the purpose of forming the diacyl derivative, the reaction is carried out in a solvent in which the acylation products are maintained in solution.

8. A method according to claim 1, wherein the starting material is acylated by reacting the same with acid chlorides in the presence of compounds of basic reaction.

9. A method according to claim 1, wherein the starting material is acylated by reacting the same with acid anhydrides.

10. A method according to claim 1, wherein the starting material is acylated by reacting the same with acid anhydrides in the presence of acylating catalysts.

11. The method of producing derivatives of germinal gland hormone preparations having improved physiological activity, which comprises subjecting a compound of the cyclopentano phenanthrene series having a methyl group in the 13-position and also in at least one of the 10- and 17-positions, and hydroxyl groups in the 3- and 17-positions to the action of an acylating agent, and isolating the resulting acyl derivative.

12. The method of modifying the physiological activity of saturated 3,17-dihydroxy cyclopentano phenanthrene compounds, which comprises subjecting a saturated 3,17-dihydroxy cyclopentano phenanthrene compound having at the 16-position a member of the group consisting of hydrogen, hydroxyl and O-acyl groups, to the action of an acylating agent, and recovering the acylated product.

13. The method of modifying the physiological activity of a 3,17-dihydroxy cyclopentano phenanthrene compound having in the 17-position also a member of the group consisting of alkyl and aryl radicals, which comprises subjecting said compound to the action of an acylating agent, and recovering the resulting acylated product.

14. Acyl derivatives of cyclopentano tetradecahydro phenanthrene compounds of the following structural formula

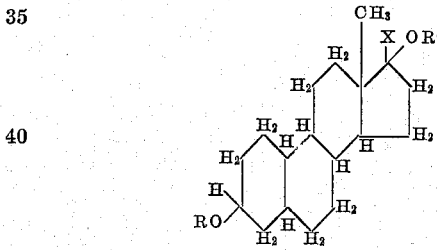

wherein X represents a hydrocarbon radical of the alkyl and aryl groups, R' a member of the group consisting of hydrogen and acyl groups and R an acyl group; said derivatives having a physiological activity similar to that of the male sex hormones.

15. Acyl derivatives of cyclopentano tetradecahydro phenanthrene compounds of the following structural formula

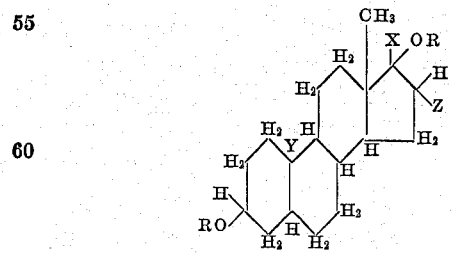

wherein X represents a hydrocarbon radical of the alkyl and aryl groups, Y is a member of the group consisting of hydrogen and the methyl group, Z is a member of the group consisting of hydrogen and the —OR group, and R is a member of the group consisting of hydrogen and acyl groups, at least one R being acyl, said derivatives having a physiological activity similar to that of the male sex hormones.

16. Acyl derivatives of cyclopentano tetradecahydro phenanthrene compounds of the following structural formula

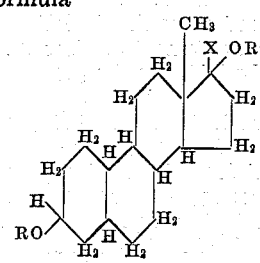

wherein X represents an alkyl group, R' a member of the group consisting of hydrogen and acyl groups and R an acyl group; said derivatives having a physiological activity similar to that of the male sex hormones.

17. Acyl derivatives of cyclopentano tetradecahydro phenanthrene compounds of the following structural formula

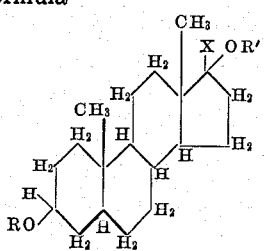

wherein X represents an alkyl group, R' a member of the group consisting of hydrogen and acyl groups and R an acyl group; said derivatives having a physiological activity similar to that of the male sex hormones.

18. Acyl derivatives of cyclopentano tetradecahydro phenanthrene compounds of the following structural formula

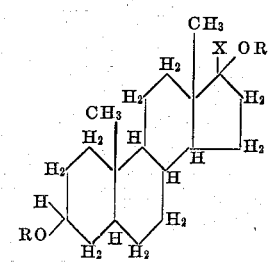

wherein X represents an aryl group, R' a member of the group consisting of hydrogen and acyl groups and R an acyl group; said derivatives having a physiological activity similar to that of the male sex hormones.

WALTER SCHOELLER.
FRIEDRICH HILDEBRANDT.
ERWIN SCHWENK.